US012059936B2

United States Patent
Werner et al.

(10) Patent No.: US 12,059,936 B2
(45) Date of Patent: Aug. 13, 2024

(54) AIR SPRING MODULE

(71) Applicant: Vibracoustic SE, Darmstadt (DE)

(72) Inventors: Philipp Werner, Lueneburg (DE);
Erhard Moog, Sittensen (DE)

(73) Assignee: Vibracoustic SE, Darmstadt (DE)

( * ) Notice: Subject to any disclaimer, the term of this patent is extended or adjusted under 35 U.S.C. 154(b) by 409 days.

(21) Appl. No.: 17/433,430

(22) PCT Filed: Jan. 22, 2020

(86) PCT No.: PCT/EP2020/051494
§ 371 (c)(1),
(2) Date: Aug. 24, 2021

(87) PCT Pub. No.: WO2020/173623
PCT Pub. Date: Sep. 3, 2020

(65) Prior Publication Data
US 2022/0161623 A1    May 26, 2022

(30) Foreign Application Priority Data

Feb. 25, 2019 (DE) .......................... 102019104714.5

(51) Int. Cl.
*B60G 17/04*    (2006.01)
*B60G 15/12*    (2006.01)
*B60G 17/052*    (2006.01)

(52) U.S. Cl.
CPC .......... *B60G 15/12* (2013.01); *B60G 17/0521* (2013.01); *B60G 2202/152* (2013.01);
(Continued)

(58) Field of Classification Search
CPC ................ B60G 15/12; B60G 17/0521; B60G 2202/152; B60G 2202/314; B60G 2204/1262; B60G 2206/4222
(Continued)

(56) References Cited

U.S. PATENT DOCUMENTS 4,555,096 A * 11/1985 Pryor ...................... F16F 9/084
                                                        267/64.21
4,613,116 A *  9/1986 Buma ................ B60G 17/0432
                                                        267/64.25
(Continued)

FOREIGN PATENT DOCUMENTS

CN           2926663 Y      7/2007
CN         103244597 A      8/2013
(Continued)

OTHER PUBLICATIONS

Translation of ISR PCT/EP2020/051494, dated May 12, 2020.
(Continued)

*Primary Examiner* — Christopher P Schwartz
(74) *Attorney, Agent, or Firm* — Fishman Stewart PLLC

(57) ABSTRACT

The invention relates to an air spring module having an air spring and a shock absorber for the suspension and damping of vibrations of a motor vehicle chassis. The air spring has a rolling bellows which is fastened to an air spring cover and a rolling piston. The rolling bellows at least partially delimits a first working space filled with compressed air. At least two working spaces are provided in the rolling piston, which are separated from one another by a partition and connectable to the first working space via switchable valves arranged in the rolling piston. In order to achieve simple production and installation as well as a low overall height, the rolling piston has at least two working spaces which are arranged adjacent to one another.

20 Claims, 5 Drawing Sheets

(52) U.S. Cl.
CPC .................. *B60G 2202/314* (2013.01); *B60G 2204/1262* (2013.01); *B60G 2206/4222* (2013.01)

(58) Field of Classification Search
USPC .................................. 267/64.19–64.28, 122
See application file for complete search history.

(56) References Cited

U.S. PATENT DOCUMENTS

| | | | |
|---|---|---|---|
| 4,993,694 A * | 2/1991 | Gandiglio | B60G 15/12 267/122 |
| 5,669,597 A * | 9/1997 | Rittstieg | B60G 17/044 267/64.21 |
| 6,161,821 A * | 12/2000 | Leno | B60G 17/0416 188/322.19 |
| 8,191,903 B2 | 6/2012 | Beuermann et al. | |
| 9,428,029 B2 | 8/2016 | Job | |
| 9,428,092 B2 | 8/2016 | Bosma | |
| 10,161,472 B2 | 12/2018 | Hechenblaikner et al. | |
| 11,391,337 B2 * | 7/2022 | Woenarta | F16F 9/062 |
| 2003/0127781 A1 * | 7/2003 | Fritz | B60G 15/12 267/64.24 |
| 2015/0130146 A1 | 5/2015 | Moulik | |
| 2015/0210138 A1 | 7/2015 | Job | |
| 2018/0298974 A1 | 10/2018 | Dehlwes et al. | |

FOREIGN PATENT DOCUMENTS

| | | |
|---|---|---|
| CN | 104755793 A | 7/2015 |
| CN | 107740834 A | 2/2018 |
| CN | 109083965 A | 12/2018 |
| CN | 109281975 A | 1/2019 |
| DE | 3233160 A1 | 3/1984 |
| DE | 102007050187 A1 | 4/2009 |
| DE | 102013212978 A1 | 4/2014 |
| DE | 102013113737 A1 | 6/2015 |
| EP | 2888503 A1 | 7/2015 |
| JP | S59-06106 A | 1/1984 |
| JP | H04-211739 A | 8/1992 |
| JP | 2007046699 A | 2/2007 |
| WO | 14/060123 A1 | 4/2014 |
| WO | 16/168500 A1 | 10/2016 |
| WO | 2016168500 A1 | 10/2016 |

OTHER PUBLICATIONS

German First Office Action, 102019104714.5, Dated Nov. 14, 2019.
Translation of German First Office Action, 102019104714.5, Dated Nov. 14, 2019.
Chinese Office Action, 202080014681.0, dated Nov. 11, 2022 with translation.

* cited by examiner

AIR SPRING MODULE

CROSS-REFERENCE TO RELATED APPLICATIONS

This application is a National Stage Patent Application of International Patent Application No. PCT/EP2020/051494, filed Jan. 22, 2020, which claims the benefit of German Application Serial No. 10 2019 104 714.5, filed Feb. 25, 2019, the contents of each are incorporated by reference in their entireties.

TECHNICAL FIELD

The invention relates to an air spring module having an air spring and a shock absorber for the suspension and damping of vibrations of a vehicle chassis, wherein the air spring has a rolling bellows fastened to an air spring cover and a rolling piston, wherein the rolling bellows at least partially delimits a first working space filled with compressed air, wherein at least two working spaces are provided in the rolling piston, which are separated from one another by a partition and connectable to the first working space via switchable valves arranged in the rolling piston.

BACKGROUND

Such an air spring module is known from EP 288 503 B1. In this case, the first working space is essentially delimited by the rolling bellows. A second and a third working space, which are connectable to the first working space by means of associated valves, are provided in the rolling piston. The available air spring volume or the spring rate can thus be adjusted by controlling the valves of the working spaces arranged in the rolling piston. In the known air spring module, the second and the third working space are arranged one above the other in the axial direction. Since the working spaces cannot be produced in one piece, they must be assembled from a plurality of components. This means that several joining zones are required. The valves assigned to the working spaces are positioned offset in the axial direction. Since the valves are arranged in an offset manner, an automated installation of the valves is difficult.

SUMMARY

The problem addressed by the invention is that of proposing an air spring module that allows for a simplified production of the multi-chamber rolling piston and a reliable automated installation of the valves.

For solving this problem, it is proposed for an air spring module of the initially described type that the rolling piston has at least two working spaces which are arranged adjacent to one another. The two working spaces represent additional volumes that are connectable to the first working chamber by means of the valves. As a result, the spring rate of the air spring can be adjusted. The air spring according to the invention can contain two working chambers but also three, four or more working chambers in the rolling piston. Since the working chambers of the rolling piston are arranged adjacent to one another, the associated valves can all be arranged in a single component. The positional tolerances of the valves are thus not influenced by the accuracy of the joining zones of the components of the rolling piston. All valves can be placed simultaneously by a single device without having to compensate for the positional tolerances to one another. A reliable automated installation of the valves is thus possible with a simple, cost-effective device. Furthermore, the air spring module according to the invention is characterized by a low overall height.

Advantageous embodiments of the invention are the subject matter of the dependent claims.

The valves are advantageously arranged in a horizontal plane. As a result, the positional tolerances are particularly small which allows for easy equipping and installation.

The valves are advantageously arranged in a piston lower part which is connected to a piston upper part of the rolling piston. The connection can in particular be established by means of welding.

In one advantageous development, the piston lower part has at least two valve seats for a valve.

Air openings controllable with the valve are provided on the valve seats. Said air openings can be controlled on the basis of the valve position.

Advantageously, the at least two working spaces of the rolling piston partially surround the cylinder tube of the shock absorber. This ensures good utilization of the available space.

A simple production can be achieved in that the piston upper part is designed as a one-piece component. In particular, the piston upper part can be produced as an injection molded part made of plastic.

In one advantageous embodiment, partitions, which are arranged offset in the circumferential direction, are provided to form the working spaces, wherein the partitions are preferably integrated in the piston upper part and extend in the axial direction.

The rolling bellows is advantageously fixed to the piston upper part.

In this case, the piston upper part can have a flange protruding at the front for fixing the rolling bellows.

In one advantageous development, it is provided that a support ring is assigned to the protruding flange. Said support ring is made in particular of metal.

In one advantageous development, the piston upper part can be designed to be rotationally symmetrical and in regions have a radial expansion.

The piston upper part is advantageously integrally connected, in particular welded, to the piston lower part.

In one advantageous embodiment, the rolling piston is formed from two or three plastic parts welded to one another. The number of working chambers can be varied by the number of partitions without increasing the number of components or the number of weld seams.

A plurality of working spaces can advantageously be separated in the piston lower part by additional vertical partitions which are arranged offset in the circumferential direction and are each connectable by means of an associated valve. In this way, further additional volumes can be connected for adjusting the spring rate of the air spring module.

The parts of the rolling piston are advantageously made as injection molded parts from plastic and welded to one another.

The parts of the rolling piston are advantageously welded to one another by means of hot gas welding, infrared welding, friction welding, or orbital welding.

BRIEF DESCRIPTION OF THE DRAWINGS

In the following, the invention will be described in more detail using embodiments which are shown schematically in the accompanying drawings, in which.

DETAILED DESCRIPTION

Figure 1:
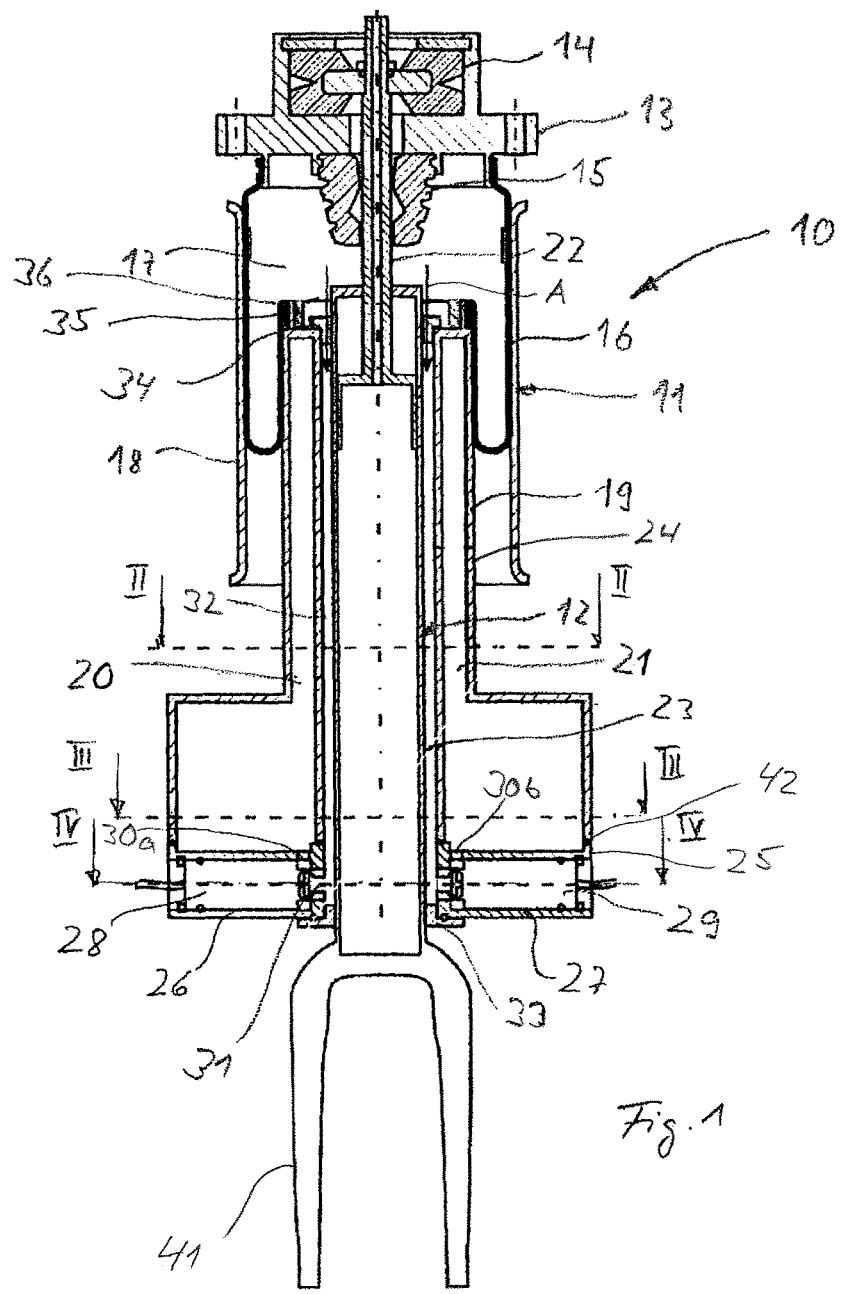
FIG. 1 shows a schematic longitudinal section of a first embodiment of the air spring module according to the invention.

The air spring module 10 shown in FIG. 1 has an air spring 11 and a shock absorber 12, which are used for the suspension and damping of vibrations of a motor vehicle chassis (not depicted). The air spring 11 has a rolling bellows 16 which is fastened to a cover 13 and to a rolling piston 19. The rolling bellows 16 delimits a first working space 17 filled with compressed air. The rolling bellows 16 is guided on the outer circumference by means of an external guide 18. The rolling bellows 16 rolls off on the outer circumference of the rolling piston 19 while forming a rolling fold.

The shock absorber 12 of the air spring module 10 has a cylinder tube 23. A piston rod 22, the end of which is mounted on a support bearing 14 accommodated in the cover 13, is accommodated in the cylinder tube 23. A stop buffer 15 is used to dampen large deflections of the piston rod 22.

The rolling piston 19 has an outer wall 39 and a radially internal inner wall 40. With the cylinder tube 23, the inner wall 40 delimits an annular channel 32 which extends in the radial direction of the air spring module 10.

The rolling piston 19 is supported on the cylinder tube 23 of the shock absorber 12 via a lower support 33 and an upper support 34. The upper support 34 is provided with air channels, which is indicated by the arrow A. The annular channel 32 is thus connected to the first working space 17.

For fastening the rolling bellows 16 to the rolling piston 19, a flange 35 protrudes from the front of the rolling piston 19. The rolling bellows 16 is fixed to the outer circumference of the flange 35 by means of a hose clamp. A support ring 36 made of metal is assigned to the flange 35.

The rolling piston 19 has a piston upper part 24 and a piston lower part 25, which are each made of plastic. The piston upper part 24 and the piston lower part 25 are connected via a weld seam 42. For this purpose, a hot gas, infrared, friction, or orbital welding process can be used.

Figure 2:
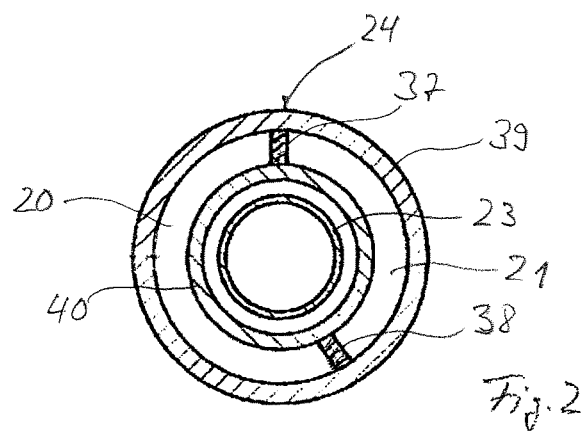
FIG. 2 shows a section along the line II-II in FIG. 1.

As can be seen from FIG. 2, which shows a section along the line II-II in FIG. 1, the piston upper part 25 has an outer wall 39 and a radially internal inner wall 40. The outer wall 39 and the inner wall 40 are connected to one another via partitions 37, 38. The partitions 37, 38 delimit a second working space 20 and a third working space 21, which are arranged adjacent to one another in one plane and are also filled with compressed air. The partitions 37, 38 run in the axial direction of the air spring module 10 and extend into the piston lower part 25.

Figure 3:
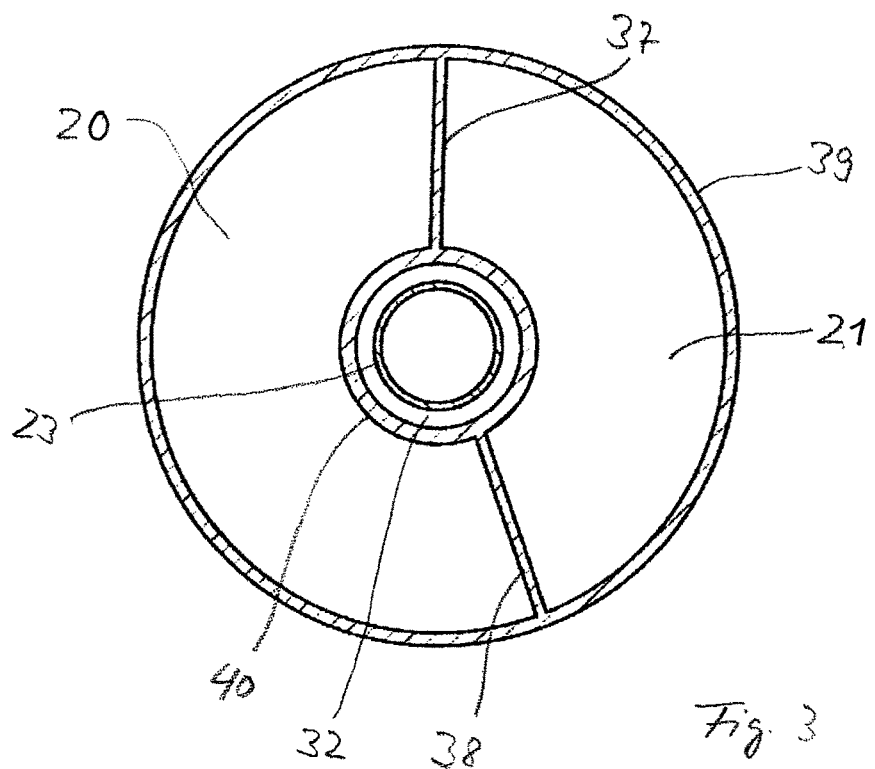
FIG. 3 shows a section along the line in FIG. 1.

As can be seen from FIG. 3, the piston upper part has a radial expansion in its lower region with respect to the upper part of the piston upper part 24. In this region, the two working spaces 20, 21 are also separated from one another by the partitions 37, 38.

Figure 4:
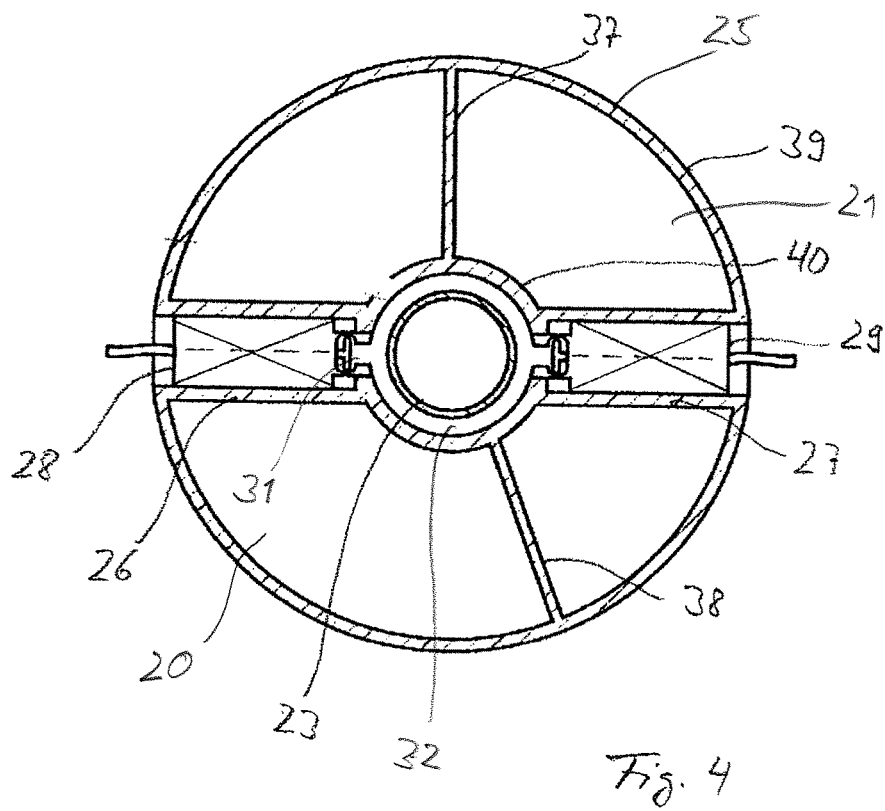
FIG. 4 shows a section along the line IV-IV in FIG. 1.

FIG. 4 shows a horizontal section of the piston lower part 25 along the line IV-IV in FIG. 1. The piston lower part 25 is integrally connected to the piston upper part 24. The connection is made via a weld seam 42, wherein in particular a hot gas, infrared, friction, or orbital welding process is provided for connecting the two parts 24, 25 of the rolling piston made of plastic. In the piston lower part 25, the two working spaces 20, 21 are also separated from one another by the two partitions 37, 38 which run in the radial direction.

The piston lower part 25 has two valve seats 26, 27 in which the valves 28, 29 are accommodated. The electrically controllable valves 28, 29 uncover an air opening 31 which is provided on the inner wall 40 of the rolling piston 19. In the open position of the valves 28, 29, the working spaces 20, 21 can be connected to the first working space 17 via the annular channel 32. As a result, the spring rate of the air spring can be adjusted.

As can be seen from FIG. 1, an air opening 30a, 30b is provided on the valve seat 26, 27 and communicates with the second working space 20 and the third working space 21.

The valve seats 26, 27 are provided in the piston lower part 25. In this case, the valve seats 26, 27 and the valves 28, 29 lie in one plane. This allows for the placement of the valves 28, 29 in the rolling piston 19 in a simple manner, so that the installation can be carried out reliably in an automated manner with only a single device without compensating devices for the positional tolerances to one another. Furthermore, a low overall height of the air spring module 10 is achieved by this design.

Both the piston upper part 24 and the piston lower part 25 are produced as injection molded parts made of plastic. In principle, said parts can also be produced as a sheet metal structure or by means of aluminum die casting. The partitions 37, 38 are integral with the piston parts 24, 25. This allows for a simple production of the rolling piston 19 from few components.

Figure 5:
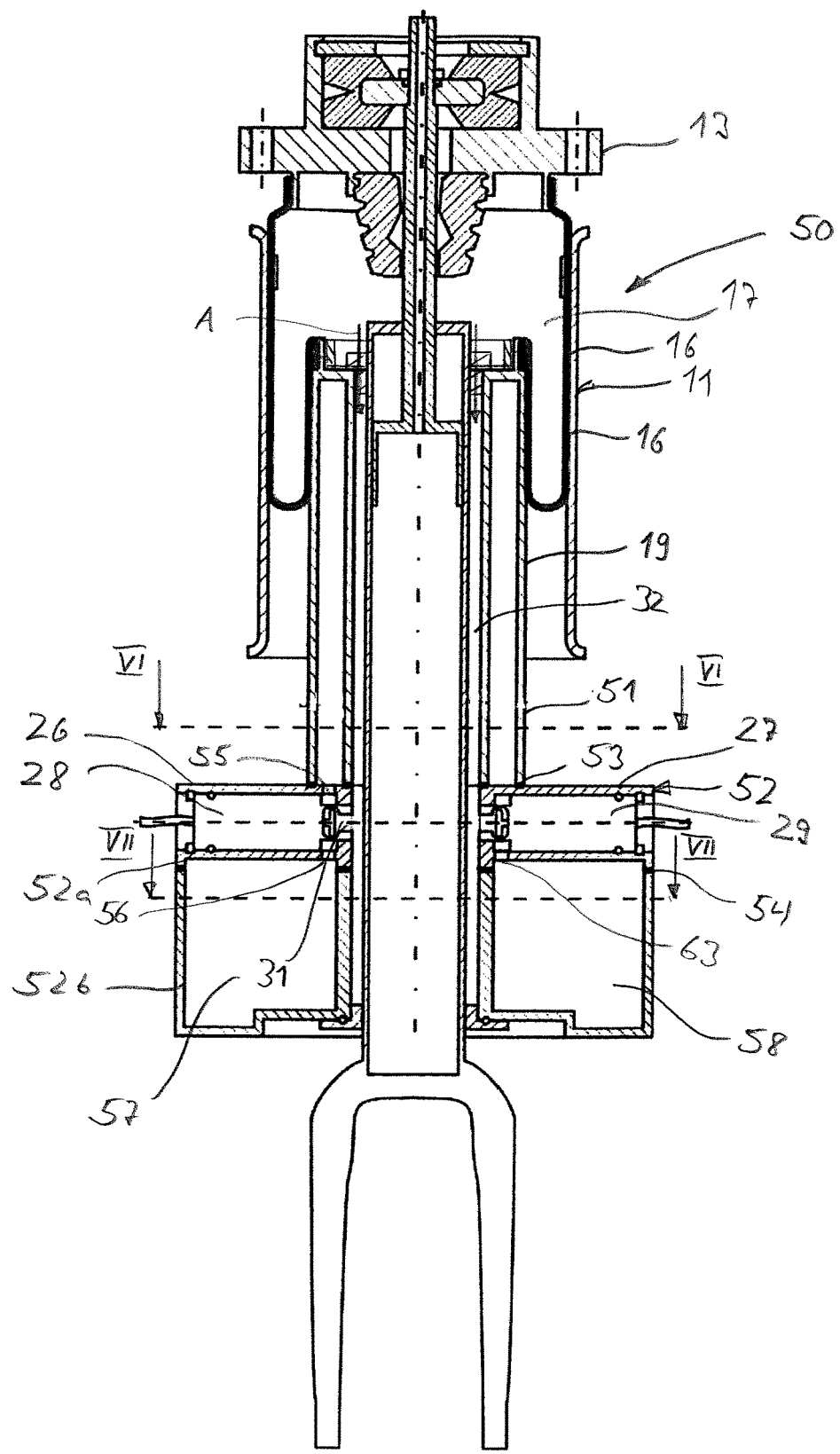
FIG. 5 shows a schematic longitudinal section of a second embodiment of the air spring module according to the invention.

FIG. 5 shows a second embodiment of the air spring module 10 according to the invention. In the following description, the terms already used above will be used for identical or functionally identical parts.

FIG. 5 shows a longitudinal section of an air spring module 50 which differs from the air spring module 10 shown in FIG. 1 only in the structural design of the rolling piston 19. It has a piston upper part 51 which is produced as a plastic injection molded part. The piston upper part 51 is connected to the piston lower part 52 via a weld seam 53.

Figure 6:
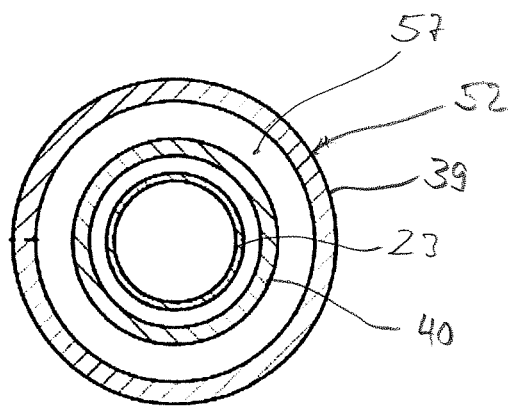
FIG. 6 shows a section along the line VI-VI in FIG. 5.

FIG. 6 shows a section along the line VI-VI in FIG. 5. The piston upper part has an outer wall 39 and an inner wall 40, which delimit a second working space 57. No partition is provided in the region of the piston upper part 52. The second working space 20 thus surrounds the cylinder tube 23 in this region.

The piston lower part 52 has a first part 52a in which the valve seats 26, 27 for receiving the valves 28, 29 are provided. The first part 52a is connected to a second part 52b, which forms the bottom of the rolling piston 19, via a weld seam 54.

Figure 7:
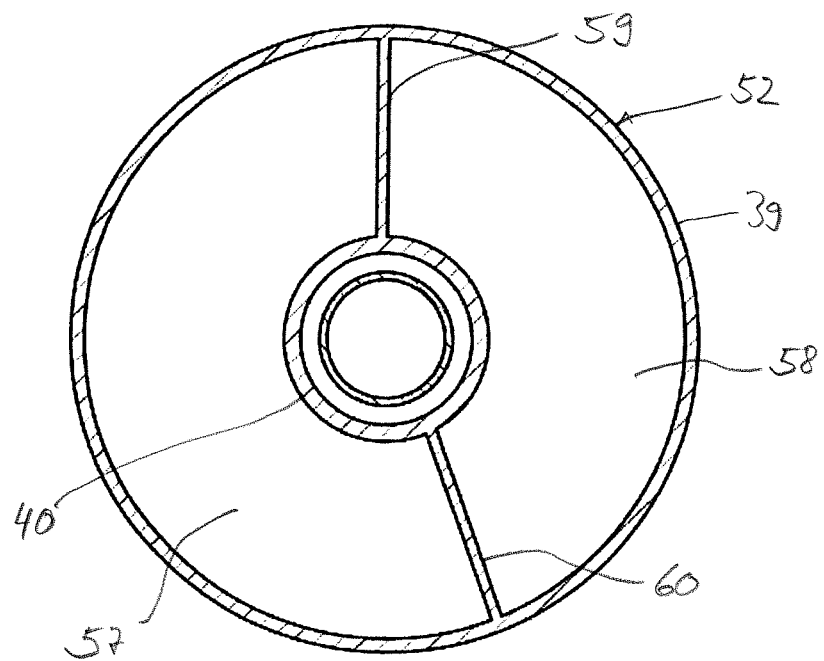
FIG. 7 shows a section along the line VII-VII in FIG. 5.

The piston lower part 52 is designed to be widened in the radial direction with respect to the piston upper part 51. The second working space 57 extends from the piston upper part 51, as can be seen from FIG. 7 which shows a section along the line VII-VII in FIG. 5.

In this region, the piston lower part 52 has partitions 59, 60 offset in the circumferential direction, which separate the second working space 57 from the third working space 58 such that they only partially surround the shock absorber 12.

The working spaces 57, 58 can be controlled separately via the assigned valves 28, 29. When the valves 28, 29 are controlled, the air openings 55, 56, 63 are uncovered. As a result, the second and the third working space 57, 58 can be connected to the first working space 17 via the annular channel 32.

By arranging the valves 28, 29 in one plane, producing and equipping the air spring module 50 is possible in a simple manner. In addition, the module has a low overall height because the working spaces 57, 58 are arranged adjacent to one another.

Figure 8:
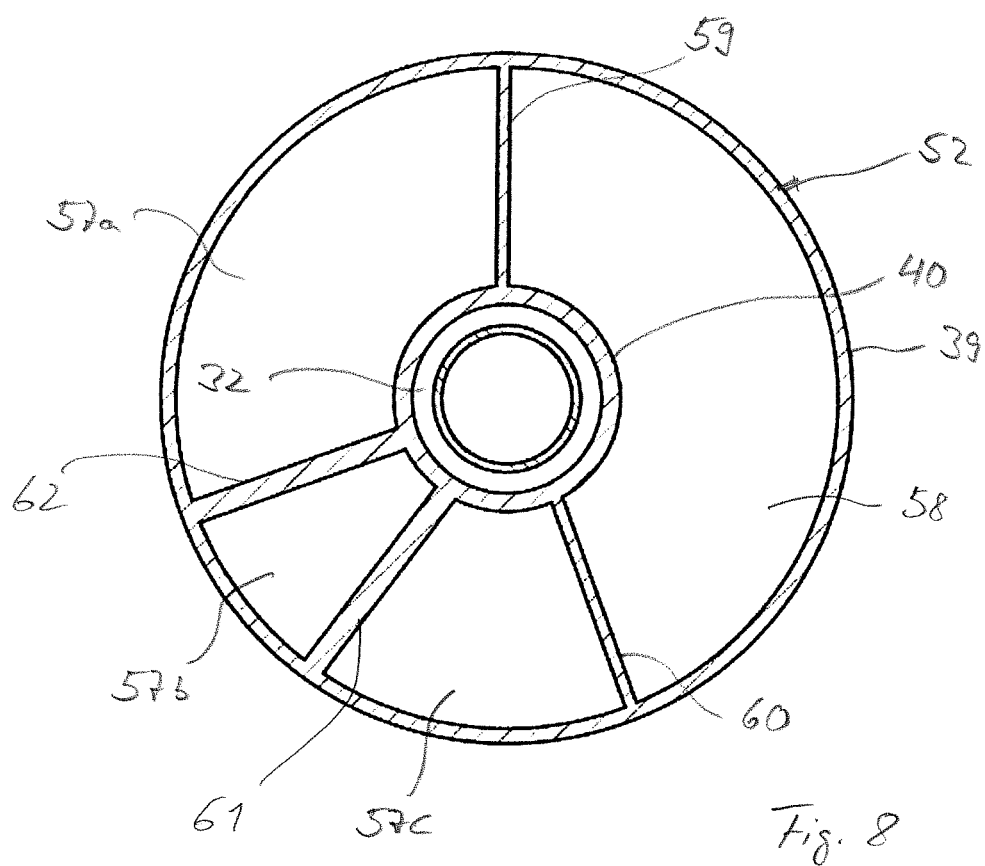
FIG. 8 shows a section of the piston lower part in a third embodiment of the air spring module according to the invention.

FIG. 8 shows a further design variant of the air spring module 50 according to the invention in the region of the piston lower part 52. In this case, the second working space 57 is subdivided into further sub-spaces 57a, 57b, 57c which are separated from one another by means of partitions 61, 62. In principle, the available installation space can be divided as desired around the circumference by means of the partitions 59, 60, 61, 62. In this case, the partitions 59, 60, 61, 62, as in the embodiment according to FIG. 1, can be continued into the piston upper part or, as shown in FIG. 5, only divide the piston lower part into further chambers. The sub-spaces 57a, 57b, 57c have associated valves (not depicted) with which the sub-spaces 57a, 57b, 57c are connectable via air openings (also not depicted) to the first working space 17 via the annular channel 32.

The invention claimed is:

1. An air spring module, comprising:
   an air spring; and
   a shock absorber for suspension and damping of vibrations of a motor vehicle chassis;
   wherein the air spring has a rolling bellows fastened to an air spring cover and a rolling piston; the rolling bellows at least partially delimits a first working space filled with compressed air; at least two working spaces are provided in the rolling piston, the at least two working spaces are separated from one another by a partition and are connectable to the first working space via switchable valves arranged in the rolling piston; the at least two working spaces are arranged adjacent to one another; and for forming the at least two working spaces, the partition and at least one other partition are arranged offset in a circumferential direction.

2. The air spring module according to claim 1, wherein the valves are arranged in a piston lower part which is connected, via a weld, to a piston upper part of the rolling piston.

3. The air spring module according to claim 2, wherein the piston lower part has at least two valve seats for a valve.

4. The air spring module according to claim 3, wherein the at least two valve seats have tube air openings that can be controlled by the valve.

5. The air spring module according to claim 2, wherein the piston upper part is a one-piece component.

6. The air spring module according to claim 1, wherein the parts of the rolling piston are comprised of injection molded plastic.

7. The air spring module according to claim 6, wherein the parts of the rolling piston are welded to one another.

8. The air spring module according to claim 7, wherein the parts of the rolling piston are welded to one another via one or more of hot gas welding, infrared welding, friction welding, and orbital welding.

9. The air spring module according to claim 1, wherein the piston upper part has a protruding flange for fixing the rolling bellows.

10. The air spring module according to claim 9, wherein a support ring is connected to the protruding flange.

11. The air spring module according to claim 1, wherein the valves are arranged in a horizontal plane.

12. The air spring module according to claim 1, wherein the at least two working spaces of the rolling piston partially surround a cylinder tube of the shock absorber.

13. The air spring module according to claim 1, wherein three or more working spaces are defined by three or more partitions, the three or more partitions are arranged offset in a circumferential direction.

14. The air spring module according to claim 13, wherein the partitions are integrated in a piston upper part.

15. The air spring module according to claim 1, wherein the rolling bellows is fixed to a piston upper part.

16. The air spring module according to claim 1, wherein the piston upper part is rotationally symmetrical and, in regions, has a radial expansion.

17. The air spring module according to claim 1, wherein the piston upper part is integrally connected, via a weld, to a piston lower part.

18. The air spring module according to claim 1, wherein the rolling piston is made from two or three plastic parts welded to one another.

19. An air spring module, comprising:
    an air spring; and
    a shock absorber for suspension and damping of vibrations of a motor vehicle chassis;
    wherein the air spring has a rolling bellows fastened to an air spring cover and a rolling piston; the rolling bellows at least partially delimits a first working space filled with compressed air; at least two working spaces are provided in the rolling piston, which are separated from one another by a partition and connectable to the first working space via switchable valves arranged in the rolling piston; the rolling piston has at least two working spaces which are arranged adjacent to one another; and in a piston lower part, a plurality of working spaces is separated by additional vertical partitions.

20. The air spring module according to claim 19, wherein the additional vertical partitions are arranged offset in a circumferential direction and are each connectable via an associated valve.

* * * * *